United States Patent [19]
Rodhall et al.

[11] Patent Number: 5,463,595
[45] Date of Patent: Oct. 31, 1995

[54] PORTABLE SECURITY SYSTEM FOR OUTDOOR SITES

[76] Inventors: Arne Rodhall, 22313 76th Ave. W., Edmonds, Wash. 98026; Donald E. Taylor, 1119 Cascade Dr., Everett, Wash. 98203

[21] Appl. No.: 135,795

[22] Filed: Oct. 13, 1993

[51] Int. Cl.$^6$ ................................ G01S 9/66; G08B 23/00
[52] U.S. Cl. .................. 367/93; 340/573; 340/522; 340/426
[58] Field of Search .................... 367/93; 340/573, 340/522, 426

[56] References Cited

U.S. PATENT DOCUMENTS

| | | | |
|---|---|---|---|
| 3,973,250 | 8/1976 | Uffelman | 340/274 R |
| 4,222,119 | 9/1980 | Brunner-Schwer | 367/93 |
| 4,288,867 | 9/1981 | Guthart | 367/93 |
| 4,386,341 | 5/1983 | Yamamoto | 340/384 E |
| 4,540,978 | 9/1985 | Burns et al. | 340/554 |
| 4,602,357 | 7/1986 | Yang et al. | 367/93 |
| 4,605,922 | 8/1986 | Blattman et al. | 340/552 |
| 4,630,035 | 12/1986 | Stahl | 340/522 |
| 4,642,612 | 2/1987 | Crump | 340/541 |
| 4,658,386 | 4/1987 | Morris | 367/139 |
| 4,722,875 | 9/1988 | Maddox | 367/93 |
| 4,800,540 | 1/1989 | Annala | 367/93 |
| 4,845,464 | 7/1989 | Drori et al. | 340/429 |
| 4,857,912 | 8/1989 | Everett, Jr. et al. | 340/825.3 |
| 4,882,567 | 11/1989 | Johnson | 367/93 |
| 4,942,384 | 7/1990 | Yamauchi et al. | 340/522 |
| 5,109,216 | 4/1992 | Yarbrough | 340/522 |
| 5,214,411 | 5/1993 | Herbruck | 340/573 |
| 5,315,285 | 5/1994 | Nykerk | 340/426 |

OTHER PUBLICATIONS

Racon Brochure, Relocatable Detection and Volumetric Detection.
Racon Brochure, Model RDS16000–Series RDS16001, 1993.
Racon Brochure, Price Schedule, Jan. 1994.
Racon Brochure, Model 21000, Series 21100, 1993.

Primary Examiner—John K. Peng
Assistant Examiner—Albert K. Wong
Attorney, Agent, or Firm—Christensen, O'Connor, Johnson and Kindness

[57] ABSTRACT

A security system (10) suitable for use in monitoring property at an outdoor site that includes a portable housing (12) that supports a motion detector (14) for sensing motion within a detection zone. The security system further includes an ultrasonic transducer (74) and several alarm generators capable of repelling a human intruder, including a high intensity illumination source (18), high decibel siren (82), strobe light (19), and a speaker (78) for transmitting a prerecorded message. When an intrusion is initially detected by the motion detector, the ultrasonic transducer is activated to emit an ultrasonic signal that is irritating to nonhuman animals, thus clearing the detection zone of nonhuman intruders. If after sounding of the ultrasonic transducer motion is still detected, one or more of the alarms is activated. Additionally, an automatic telephone dialer (86) may be included in the system and activated by the system as another type of alarm, in response to detected intrusion. The system is integrated within the portable housing and is resistant to false alarms, making it suitable for use in monitoring property stored at an outside site. A method for utilizing the security system to protect property is also disclosed.

18 Claims, 8 Drawing Sheets

PORTABLE SECURITY SYSTEM FOR OUTDOOR SITES

FIELD OF THE INVENTION

The present invention relates to security systems, and more particularly to electronic portable security systems for use in protecting outdoor sites.

BACKGROUND OF THE INVENTION

Electronic security systems have been increasingly employed in recent years to protect building structures from intrusion, vandalism, and theft of contents. Some conventional security systems are based on a secured perimeter, which when breached activates an audio alarm and/or sends a signal to a security monitoring firm or the police. Other conventional systems utilize commercially available motion detectors to monitor for movement within the secured building. Detection of motion results in the sounding of an alarm.

Examples of motion detector-based security systems for building structure protection are disclosed in U.S. Pat. Nos. 4,288,867 to Guthard, which discloses a security system utilizing an ultrasonic motion detector, and 4,857,912 to Everett, Jr., et al., which discloses a multisensor security system including ultrasonic, optical, microwave, infrared, and video motion detectors.

A further example of a conventional building structure security system is disclosed by U.S. Pat. No. 4,642,612 to Crump, which discloses an interior security system that may include motion detectors mounted to monitor the exterior of a house. This system includes both audio alarms and an automatic phone dialer that are activated in response to detected intrusion. Such conventional security systems are typically designed for indoor use.

Another type of conventional security system is disclosed by U.S. Pat. No. 4,602,357 to Yang et al. The system includes multiple miniature portable transmitters that can be triggered to produce a coded ultrasonic or audio signal. The signals are received by correspondingly coded receivers that communicate via hard wire, a telephone link or wireless radio with a central processing unit. The transmitters may include accelerometers to detect movement of property with which they are associated, and may be used externally, such as in parking lots. However, such transmitters need to be mounted directly on the property being protected. In addition, the disclosed system includes many separate components, and thus is difficult to set up and maintain.

Convenient electronic security systems for monitoring exterior sites, such as construction zones and pools, have not been available. Likewise, security systems for protecting outdoor property, such as automobiles and boats, are not available, except for dedicated security systems that are mounted within or directly on the vehicle. This is particularly true when the site or property to be protected is not surrounded by a perimeter, such as a fence, breaches in which could be monitored in order to detect intrusion.

Another problem associated with conventional security systems based on motion detectors is the likelihood of false alarms. While security systems generally are intended to detect human intrusion, they are also activated by any other detected motion, including intruding pets or naturally occurring falling objects. Such problems would be compounded in any system expected to monitor an external site, because of the greater likelihood of animal intrusion, including cats, dogs, birds, rodents, and other creatures.

U.S. Pat. No. 5,214,411 to Herbruck discloses an animal repelling device including a battery power pack and an ultrasonic emitter. The emitter is adjustable and positioned relative to the housing to create different patterns of ultrasonic monitoring. An infrared detector integrated within the housing detects animal motion and then activates an ultrasonic emitter to drive the animal away. However, this system is primarily intended to repel animals to prevent soiling of the user's property. The system does not include any hardware for activating an alarm audible to humans or any other type of alarm device intended to repel humans or call aid to deal with the intrusion.

U.S. Pat. No. 4,658,386 to Morris discloses a lid for a garbage can that is outfitted with an infrared detector and an ultrasonic sound generator to repel animals. Again, no provision to repel intruders exists.

There thus exists a need for an integrated, portable security system for use in monitoring exterior sites that is not prone to frequent false alarms.

SUMMARY OF THE INVENTION

The present invention provides a portable security system for protection of property within a monitored area from human intruders. The portable security system includes a portable housing and a detector mounted on the housing for sensing an intrusion within the monitored area and producing a detection signal when an intrusion event is detected. The security system also includes a first alarm generator mounted within the housing for producing an alarm capable of repelling a human intruder, a controller mounted within the housing for activating the first alarm generator in response to a detection signal from the detector, and a power supply for powering the detector, the first alarm generator, and the controller.

The present invention thus provides a portable security system that may be utilized to monitor property at an exterior site. Because the components of the security system are integrated within a portable housing, the system is easily transported and set up at a desired location. No perimeter fencing or other structure enclosing the site is required for effective operation of the security system.

In a further aspect of the present invention, a security system, and operation method therefor, is provided that includes a detector for sensing an intrusion within a monitored area and producing a detection signal when intrusion is detected, a first alarm generator for producing an alarm capable of repelling a human intruder, and an ultrasonic signal generator. A controller is included in the security system and activates the ultrasonic signal generator for at least a portion of a first time period in response to a first detection signal from the detector. The ultrasonic signal generator generates an ultrasonic signal that is irritating to nonhuman animals, and is effective at driving such animals from the monitored area. The controller activates the first alarm generator if at the end of the first time period the detector is then producing a detection signal. The security system further includes a power supply for powering the detector, the first alarm generator, the ultrasonic single generator, and the controller.

By activating the ultrasonic signal generator and then checking for continued or repeated detected intrusion before operating the alarm generator, false alarms are minimized. This makes the security system particularly well suited for use at exterior sites and other sites that are not secured by perimeter structures, because of the increased likelihood of false alarms that would otherwise be produced by intruding animals.

In a still further aspect of the present invention, a method for protecting property within a monitored area from human intrusion is disclosed. The method involves positioning a plurality of portable security systems around the perimeter of the monitored area. Each security system includes a detector for sensing an intrusion within a corresponding detection zone and for producing a detection signal when intrusion is detected, an alarm generator for producing an alarm and a controller for activating the alarm generator in response to a detection signal from the detector. The method further involves interlinking the plurality of portable security systems so that the controllers of the security system communicate with each other. The detector of each of the security systems is then operated until a detection signal is generated by the detector of a first one of the security systems. The controller of the first security system then communicates with the controllers of the other security systems, whereby the controllers of the other security systems become subservient to the controller of the first security system and the alarm generator of each of the security systems is activated. By utilizing this method, a large monitored area can be protected by positioning the portable security systems such that their detection zones complement each other.

BRIEF DESCRIPTION OF THE DRAWINGS

The present invention will be better understood in view of the following detailed description, when taken in conjunction with the accompanying drawings, wherein.

DETAILED DESCRIPTION OF THE PREFERRED EMBODIMENT

Figure 1:
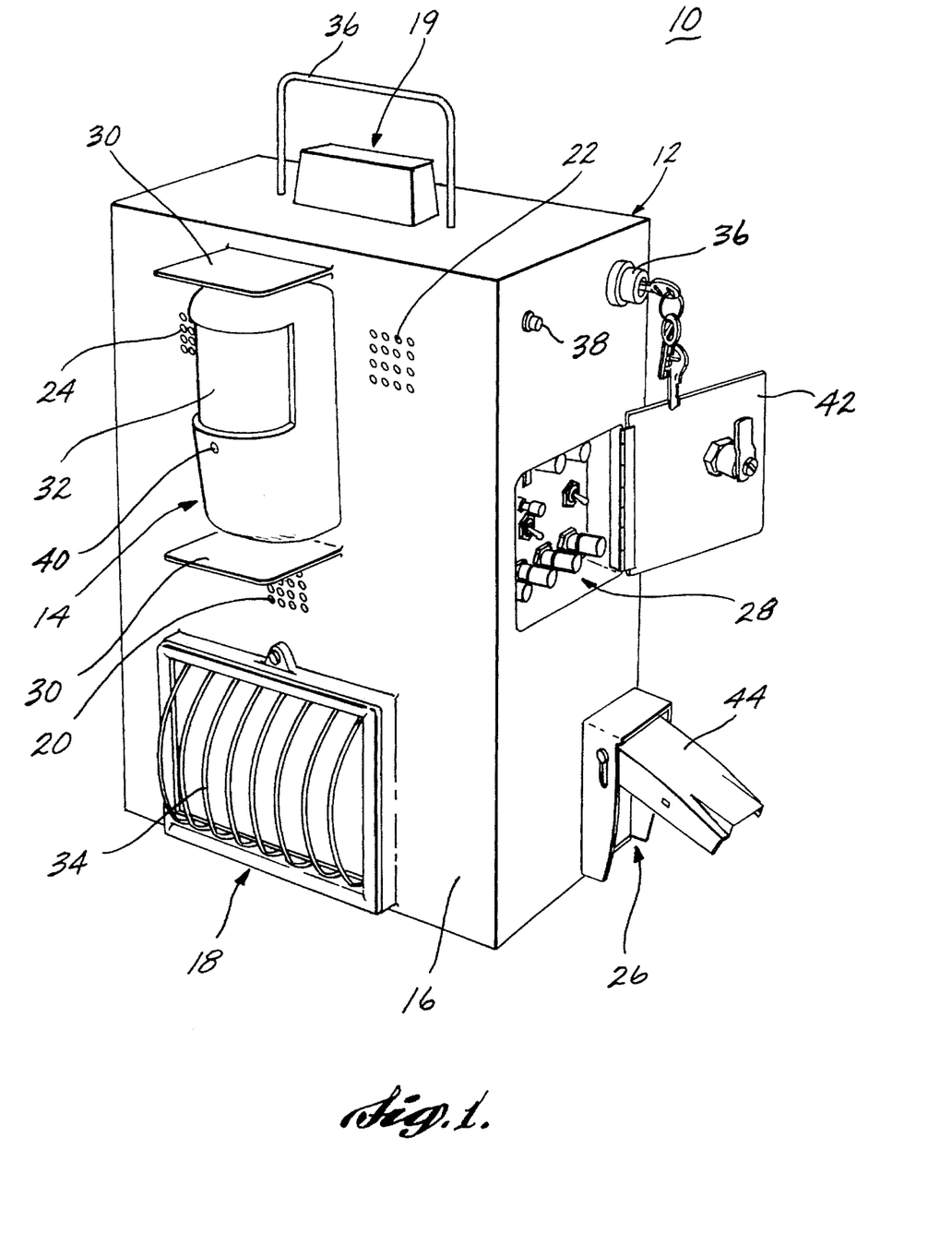
FIG. 1 is an isometric view of a portable security system constructed in accordance with the present invention.

A security system 10 constructed in accordance with the present invention is shown in FIG. 1. The security system 10 includes a portable housing 12 that supports a motion detector 14 for sensing motion within a detection zone sector extending from the front face 16 of the motion detector 14. The security system 10 further includes a high intensity illumination source 18 mounted within the front face 16 of the housing 12. A strobed light source 19 is also mounted on the housing 12.

A first set of apertures 20 in the front face 16 emit sound from an ultrasonic signal generator (not shown in FIG. 1). A second set of apertures 22 in the front face 16 of the device emit sound from a high decibel siren (not shown in FIG. 1) housed within the housing 12. A third set of apertures 24 in the front face 16 of the housing 12 emit a message from a speaker (not shown in FIG. 1) housed within the housing 12. Power is supplied to the security system 10 from an alternating current power source (not shown) connected to a socket 26 mounted through the housing 12. The security system 10 also includes two or more connectors, such as coaxial connectors, to enable the security system 10 to be interlinked with other security systems, as shall be described subsequently. A control panel 28 contains operator interface controls for operating a controller (not shown in FIG. 1) housed within the housing 12. Operation of the motion detector 14, illumination source 18, strobed light source 19, ultrasonic transducer, siren, and speaker are controlled by the controller, as determined by settings on the control panel 28, to detect intrusion within the detection zone of the motion detector 14 and startle intruders. The illumination source 18, strobed light source 19, ultrasonic transducer, siren and speaker are all included as alarm generators, capable of producing an audio, visual or tactile alarm that is perceptible by the human senses and have sufficient intensity to startle and thus repel a human intruder.

Referring initially to FIG. 1, construction of the housing 12 will first be described. The housing 12 is preferably formed from a rigid high-strength material that is resistant to corrosion, such as formed and welded stainless steel plate. However, it should be readily apparent that other materials, such as enameled carbon steel sheets, plastic composites or other rigid materials could be utilized. The housing 12 is constructed such that all joints are weather tight. All apertures formed through the housing for mounting of the system components are also sealed and weather tight. This enables the system 10 to be utilized at external sites in foul weather without failure. The system 10 is also ventilated to allow off-gassing from a battery, to be described subsequently, and optionally to enable cooling of the illumination source 18.

The motion detector 14 is mounted centrally on the front face 16 of the housing 12, and is physically protected by two metal plates 30 that are welded to the front face 16 of the housing and project orthogonally therefrom. The plates 30 are disposed parallel to each other and substantially parallel to the bottom of the housing 12. The plates 30 project beyond the motion detector 14, and serve to prevent breakage of an arcuate lens 32 on the front of the motion detector 14 should the unit fall in the forward direction. The motion detector 14 is capable of detecting motion within a sector expanding radially from the front face 16 of the housing 12

Located below the motion detector 14 and lower plate 30 is the illumination source 18. The illumination source 18 is preferably a high intensity lamp, such as a 500 watt halogen lamp. The illumination source 18 is protected from mechanical damage by a grill 34 positioned over the face of the illumination source 18.

A handle 36 is secured to the top of the housing 12 to enable lifting of the security system 10 for transport. A preferred embodiment of the system weighs less than 50 pounds, and is readily lifted and transported by an individual. A chain, steel cable, or other securement member can be passed through the handle to lock the housing 12 in place.

The strobed light source 19 is mounted centrally on the top of the housing 12, beneath the handle 36, and is operable to flash pulses of light at periodic intervals.

Operation of the security system 10 is enabled by a key switch 36 mounted through the side of the housing 12. When enabled by turning the key switch 36, a light emitting diode (LED)38 also mounted on the housing 12 is illuminated to indicate that the security system 10 is armed. A second LED 40 on the front face of the motion detector 14 indicates operation of the motion detector 14.

Switches and other controls are mounted within the control panel 28 of the housing 12, and are accessible by opening a locked cover 42. The switches and controls can be operated to program the operating sequence of the controller within the housing 12. The socket 26 on the housing 12 is sealed by a socket cover 44 to prevent entry of water into the housing 12. The security system 10 is preferably powered by a primary alternating power source connected to the connector 26. However, power may be alternately supplied by a battery (not shown) housed within the housing 12. The battery also acts as a backup power supply when the primary power supply is interrupted during operation of the security system 10, as shall be described subsequently.

Figure 2A:
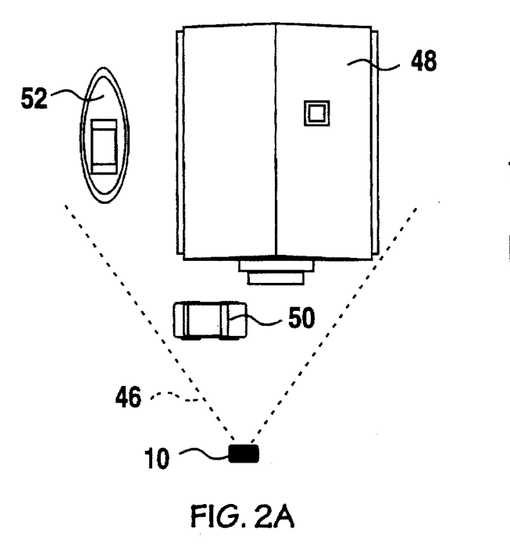
FIGS. 2A through 2D are schematic illustrations demonstrating positioning of the security system of FIG. 1 to monitor a residence and vehicles (FIG. 2A), to monitor structures within a fenced construction side (FIG. 2B), linked with a plurality of other security systems to monitor the full area of an unfenced site (FIG. 2C), and to monitor a fenced swimming pool (FIG. 2D)
Figure 2B:
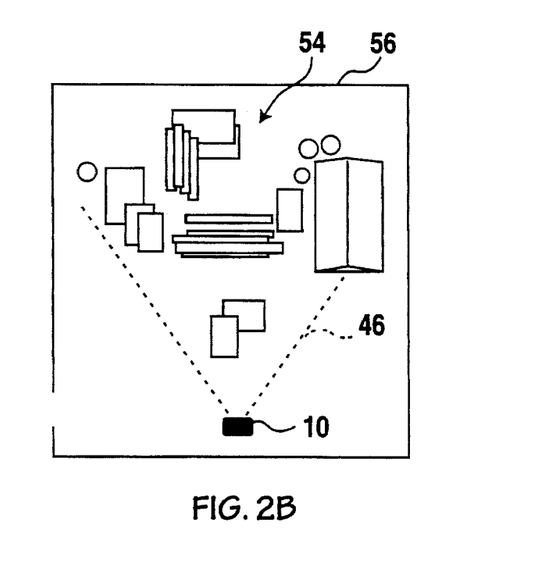

Attention is now directed to FIGS. 2A through 2D, positioning of the security system 10 to monitor various external sites shall be described. Referring first to FIG. 2A, the security system 10 has a sector detection zone 46 generated by the motion detector 14. In FIG. 2A, the security system 10 is positioned away from a residence 48 so that the entry to the residence 48, an automobile 50, and a boat 52 fall within the detection zone 46. Anyone intruding into this zone to enter, vandalize, or otherwise disturb the property will be detected and deterred by operation of the alarms contained in the security system 10. FIG. 2B illustrates positioning of the security system 10 such that the zone of detection 46 encompasses property 54 within a construction zone surrounded by a perimeter fence 56.

Figure 2C:
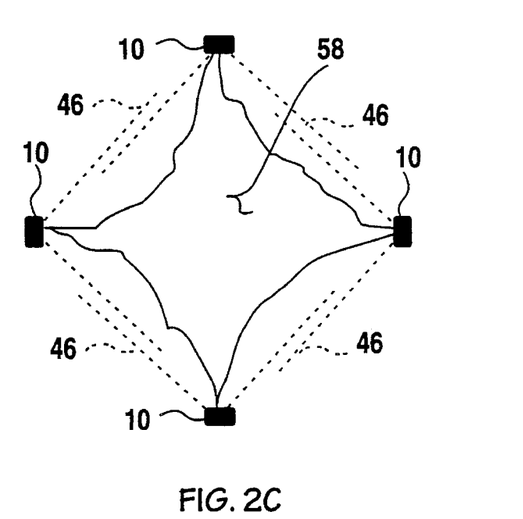
Figure 2D:
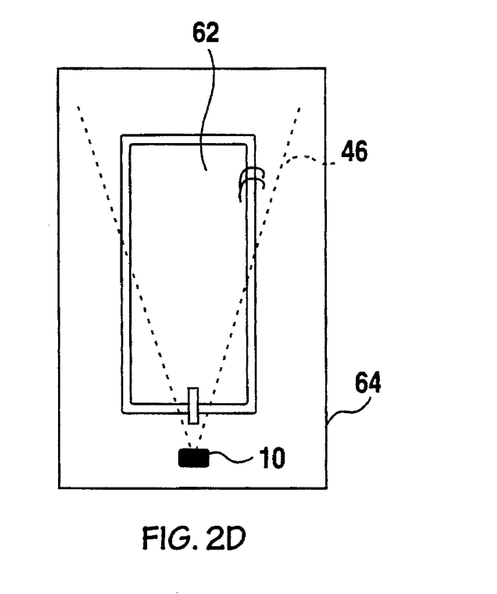

Referring to FIG. 2C, multiple security systems 10 can be positioned such that their detection zones 46 overlap in order to cover an entire expanded area 58. The individual security systems 10 are illustrated as being electrically connected by cables 60 in order to interlink the security systems 10. As shall be described subsequently below, this enables the controllers of the various security systems 10 to communicate, whereby as soon as one security system 10 detects an intrusion, the other security systems 10 become subservient to the detecting security system 10. This enables all the security systems to sound alarms simultaneously, and to cease sounding an alarm when instructed by the controller of the detecting security system 10. Rather than connection the security systems 10 using cables, it should be apparent to those of ordinary skill in the art that connection could instead be made using transmitters and receivers that communicate by , for example, radio or microwave signals FIG. 2D illustrates positioning of the security system 10 to monitor intrusion into a swimming pool 62 that is surrounded by a perimeter fence 64. The security system 10 thus serves as an extra safety precaution to ensure that children or other people do not breach the fence and enter the pool.

While the security system 10 is ideally suited for use in monitoring exterior sites, it may also be used in monitoring large interior areas, such as areas within airport hangars and warehouses, or other building structures.

Figure 3:
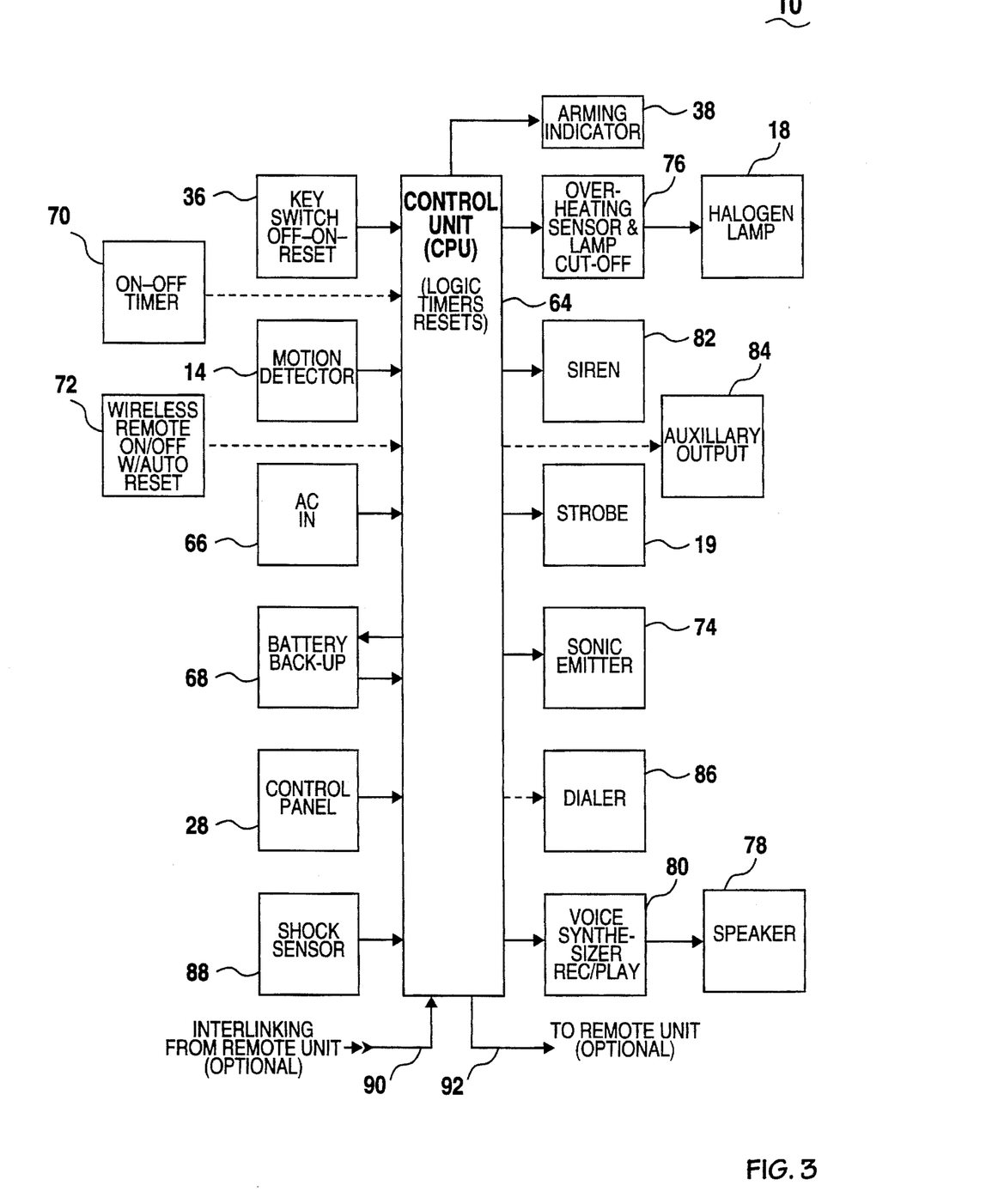
FIG. 3 provides a schematic illustration of the hardware components included in the security system of FIG. 1.

Referring to FIG. 3, the hardware contained within the security system 10 shall now be described. The operation of this hardware shall be described in detail subsequently. The security system 10 includes a control unit 64 including a programmable central processing unit (CPU), logic circuitry, timers and reset switches. The control unit 64 is operated in accordance with selected settings entered by the user using the control panel 28. In the present preferred embodiment of the present invention, the components of the control unit 64 are hard wired together, and an analog control panel 28 is utilized. However, it should be readily apparent to those of ordinary skill in the art that integrated circuitry could be utilized in place of the hard wired circuitry, and a digital keypad and display could be used in place of the switches and controls of the control panel 28.

The control unit 64 and other such components are powered using alternating current supplied by a primary power source 66. Backup power in the event of failure or interruption of the primary power source 66 is supplied by a direct current battery 68 contained within the housing 12. Operation of the system 10 is enabled by turning on the key switch 36. The key switch 36 is also utilized to reset the system, such as during testing or in the event that the alarm has been accidentally set off. It should be apparent to those of skill in the art that a keyless numeric entry pad, with multiple user codes to enable control of the individuals authorized to enter the monitored area, could be used in place of the key switch 36.

The system 10 may optionally also include an on-off timer 70, such as a seven-day event timer. The timer 70 can be utilized so that, for example, the system is automatically turned off during business hours when activity at the monitored site is expected, and is automatically turned on after business hours when security is required. In addition to or as an alternative to the key switch 36, a wireless remote controller 72 may be utilized to turn the system on and off, to reset the system, or to select other functions.

When the key switch 36, timer 70, or remote 72 is utilized to turn on the system, the armed LED 38 is lit, and the motion detector 14 becomes operational. The motion detector 14 is preferably a passive infrared motion. Examples of suitable passive infrared motion detectors are sold by SSI 2000, Inc., under Part No. LX1-AU, which has a 120° arc and 45' range detection zone, or Model LX 2-AU, which has a 120° arc and 50' range detection zone. However, alternate motion detectors having a different arc or range of detection zone, such as up to 500', may be selected as desired depending on the intended usage of the security system 10. The arcuate angle of the detection zone may also be adjusted by masking a lens 32 formed arcuately across the front of the motion detector 14. In adjusting the range of the detection zone 46, sensitivity is balanced against the area of the detection zone, with sensitivity decreasing in proportion to increases in the area of the detection zone.

Alternate suitable infrared motion detectors are available from Aleph International Corp., Optex U.S.A., Aritech Moose, Visonic Ltd., and Pulnix America, Inc. In addition to passive infrared motion detectors, other types of motion detectors such as ultrasonic, optical, microwave, infrared or video motion detectors may be utilized. Additionally, alternative types of detectors such as laser scanning detectors or frequency sensitive detectors, commonly referred to as "glass breaks," may be utilized to sense intrusion.

When the motion detector 14 initially senses motion, a sonic emitter 74, i.e. an ultrasonic transducer, is activated. The sonic emitter 74 creates a high-frequency audio signal that is irritating to many nonhuman animals, such as cats, dogs, birds and rodents. This same signal is either non detectable or generally non irritating to humans. One suitable sonic emitter 74 is sold by Electronics for Industry, Inc., under the trademark "DOG CHASER".

In addition to the sonic emitter 74, the illumination source 18, which in the preferred embodiment of FIG. 3 takes the form of a halogen lamp, is also powered at this time. A temperature sensor 76 and associated circuitry included within the housing 12 cuts off power to the illumination source 18 in the event that the internal housing temperature exceeds a threshold temperature, in order to avoid damaging of system components. Once the system cools down to below this threshold temperature, aided by optional convention vents, power is restored to the illumination source 18 by the circuitry associated with the temperature sensor 76.

The sonic emitter 74 and illumination source 18 are typically effective at repelling nonhuman intruders. If after a predetermined period of time the motion detector 14 still senses motion, or if motion is sensed continuously during the predetermined time period, the system 10 may go into a "pre-alarm" mode, as shall be described more fully below. Entry into the pre-alarm mode results in a prerecorded audio warning message being transmitted by a speaker 78 mounted within the housing 12. Speaker 78 broadcasts a verbal message that is prerecorded prior to operation of the security system 10 by the user utilizing a voice synthesizer record/ play module 80 included within the housing 10 and controlled by the control unit 64. The voice synthesizer record/ play module 80 digitizes the message and stores it in memory included in the control unit 64. However, it should be readily apparent that digital audio tape, cassette tape, or other forms of recording media could be utilized instead. The illumination source 18 is also powered during this time.

If after a predetermined period of time intrusion is still sensed, the security system 10 may then proceed into a "general alarm mode," described more fully below, and a high-decibel audio siren 82 is activated by the control unit 64. Additionally, the strobed light source 19 is activated, and power is maintained to the illumination source 18.

In addition to the siren 82, strobed illumination source 19, illumination source 18 and speaker 78, additional or alternative alarm devices may be utilized in the security system 10. An auxiliary output connector 84 is included for this purpose, in order to actuate other audio or visual alarms, for example. It should also be readily apparent, based on the disclosure contained herein, that the various alarm components of the security system 10 can be actuated in a different sequence than described above. For example, it may be desirable to activate the strobed light source 19 during the pre-alarm mode, as well as the general alarm mode.

The security system 10 preferably also includes an "automatic telephone dialer" 86 to summon aid during a general alarm, as controlled by the control unit 64. The term "automatic telephone dialer" is used herein to refer to a variety of known devices, including hard wired dialers, cellular phone dialers, UHF transmitters, VHF transmitters, or other types of transmitters. The automatic telephone dialer 86 can be programmed to communicate with police, the property owner, a security guard, or a commercial monitoring company.

The security system 10 further includes a shock sensor 88, such as an acceleration detector, that detects impacts caused by striking the security system 10. An additional tamper sensor (not shown) is included in the motion detector 14 and detects tampering with the case of the motion detector 14, and thus the housing 12. Detection of tampering by the motion detector 14 or shock by the shock sensor 88 will automatically cause the control unit 64 to activate a general alarm mode. Additionally, interruption of the AC power source 66 will likewise cause the general alarm mode to be entered into, and power is then drawn from the battery 68. In the event of interruption of AC power, however, power is removed from the illumination source 18 and associated LED indicators to prevent drainage of the battery 68.

The security system 10 further includes an input line 90 and an output line 92 for electrically connecting the security system 10 to other security systems 10 and enabling communication between the control unit 64 of the security systems 10. When so connected, each of the security systems 10 initially operates independently, sensing for detected motion within the corresponding detection zone. When a general alarm mode is entered into by any one of the security systems 10, that security system's 10 control unit 64 then assumes command of the other system's control units 64, in a master/slave relationship. The various alarms of the subservient systems then function simultaneously with the alarms of the dominant security system 10, as controlled by the control unit 64 of the dominant security system. At the termination of the general alarm, all alarms are turned off, and control is returned to the individual control units 64. This same interlinked system could be utilized to operate all systems 10 when a pre-alarm mode is entered by any one system 10.

While the system 10 has been described in the above embodiment as a stand-alone, portable system, it should also be apparent that the present invention could be alternately configured for different applications. Thus, for example, one or more portable systems 10 could be interlinked with a larger conventional, non-integrated, premise security system. The security systems 10 would act as sensors and alarm generators for the larger overall system. Also, the method of operating the security system 10, described above and in more detail below, wherein the system reacts stagewise from sonic signal generation to a pre-alarm mode, and then to a general alarm mode, could be incorporated within a larger non-integrated system, in accordance with the present invention.

System Operation

Figure 4:
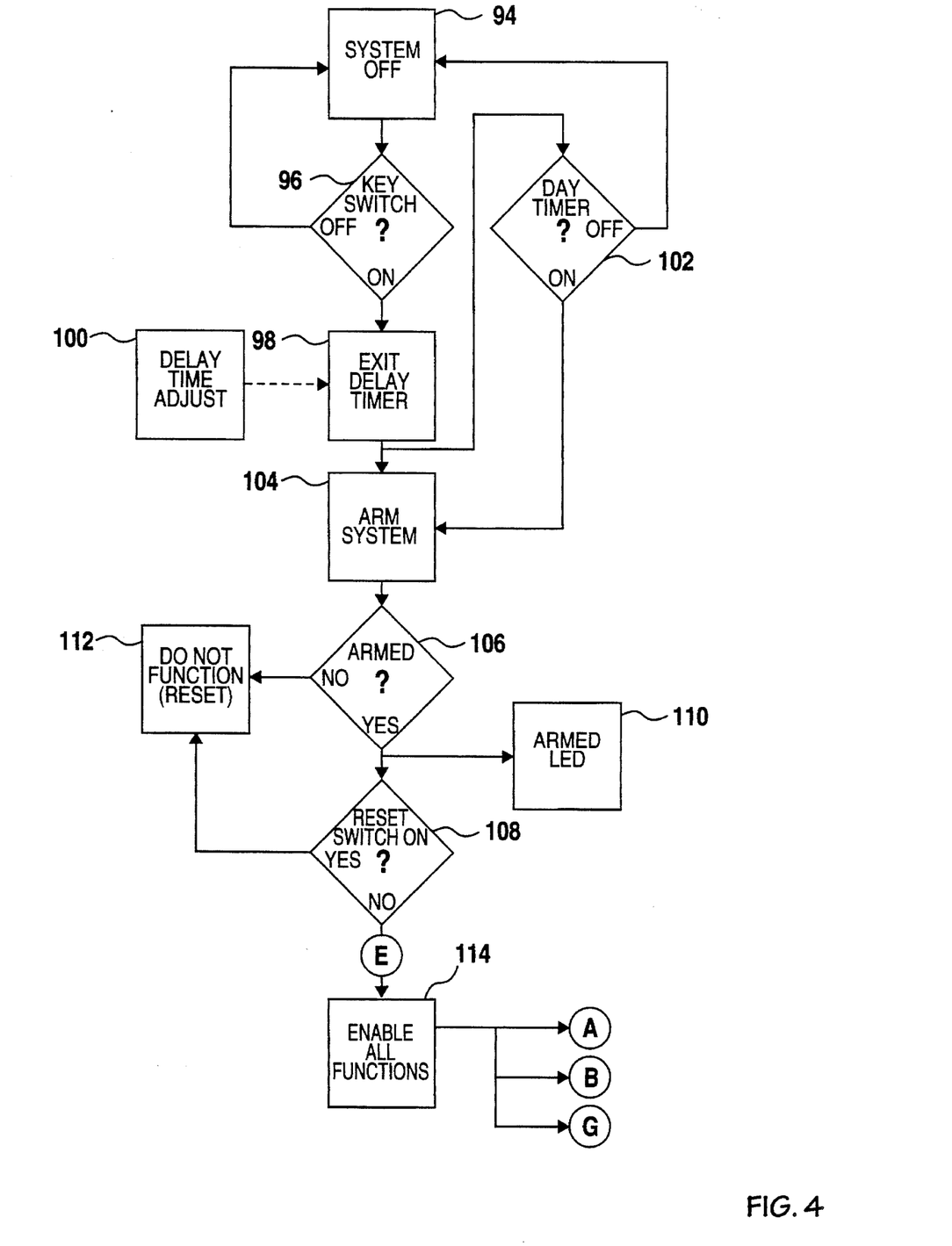
FIG. 4 is a logic flow diagram illustrating the function activation operating sequence of the CPU shown in the block diagram of FIG. 3.

The operating sequence, i.e., program, of the CPU included in the control unit 64 shall now be described with reference to FIGS. 4–8. FIG. 4 shows the logic flow diagram for initial function activation. The program initiates at block 94 with the security system 10 power turned off. The program advances to block 96 when the key switch 36 is turned to the "on" position. If at any time during operation of the security system 10, the key switch 36 is turned to the "off" position, or the timer 70 or remote 72 is utilized to turn the system off, the operating sequence will return to block 94.

The control unit 64 includes a leave delay timer that provides for a delay of enablement of the system for a finite period of time that may be adjusted, such as for a time selected from a range of 2 to 90 seconds. This allows the user to leave the monitored zone without triggering an alarm when the system is first turned on. The operating sequence thus delays at block 98 until the delay period has elapsed. The delay time interval can be adjusted by a potentiometer or other control included on the control panel 28, as indicated by block 100 in FIG. 4.

If the automatic timer 70 is being utilized, as indicated by block 102, and the time of day has been reached where the system is turned off, the operating sequence returns to block 94. If the timer 70 is not being utilized, or if it is being utilized and the system 10 is to be turned on at that time of day, the operating sequence continues to block 104 and the system is "armed." The operating sequence then progresses through blocks 106 and 108, also powering the armed LED 38 in block 110 for flashing operation. If at any time the system is disarmed (block 106) or the key switch is reset to off(block 108), the operating sequence progresses to block 112 to disable the security system 10, whereupon the operating sequence restarts at block 94. However, assuming that the system is not reset or disarmed, all system component functions are enabled at block 114.

The sequence operation then progresses at point A (FIGS. 4 and 5) to a pre-alarm and first event sequence (FIG. 5), as well as at point B (FIGS. 4 and 6) to a sonic emitter sequence (FIG. 6) and at point G (FIGS. 4 and 7) to a tamper detection sequence. Referring initially to FIG. 6 (sonic emitter sequence), from point B the operating sequence progresses to block 116 to determine whether the motion detector 14 has sensed motion, i.e. whether a detection signal has been produced. If no motion is detected, the operating sequence loops at block 116 to continue checking.

If motion is detected, the operation sequence progresses to block 118 to determine whether a general alarm mode has been entered, as shall be described subsequently. If the general alarm mode has been entered, the operating sequence loops continuously through block 118 until the general alarm is cancelled. If the general alarm mode has not been entered, the operating sequence continues to block 120, wherein the detected intrusion results in the sonic emitter 74 being activated to pulsate at periodic intervals, such as one-second intervals. The sonic emitter 74 is preferably operated for as long as the motion detector 14 senses motion. Alternately, the system 10 can be configured so that the sonic emitter is activated for another finite period of time, such as 10 seconds. After the sonic emitter 74 is activated, the program advances to block 122. If at this point the motion detector 14 still senses motion and the general alarm mode has not been entered, the operating sequence cycles back to block 120 for further operation of the sonic emitter 74. However, if the motion detector is no longer on, or if a general alarm mode has been entered, the operating sequence returns to block 116 to restart the sonic emitter sequence.

Figure 5:
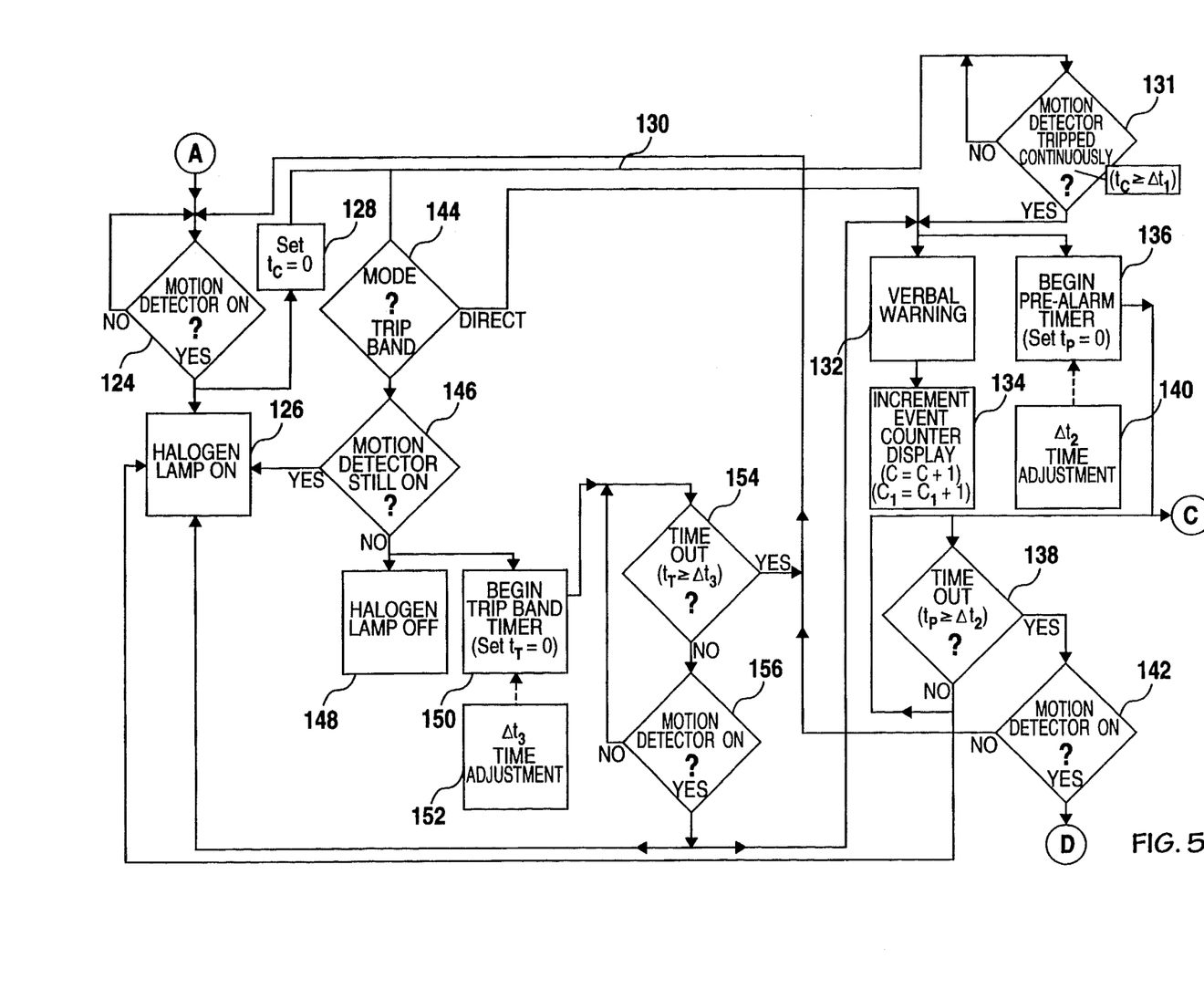
FIG. 5 provides a logic flow diagram illustrating the pre-alarm and first event operating sequence of the CPU of FIG. 3.
Figure 6:
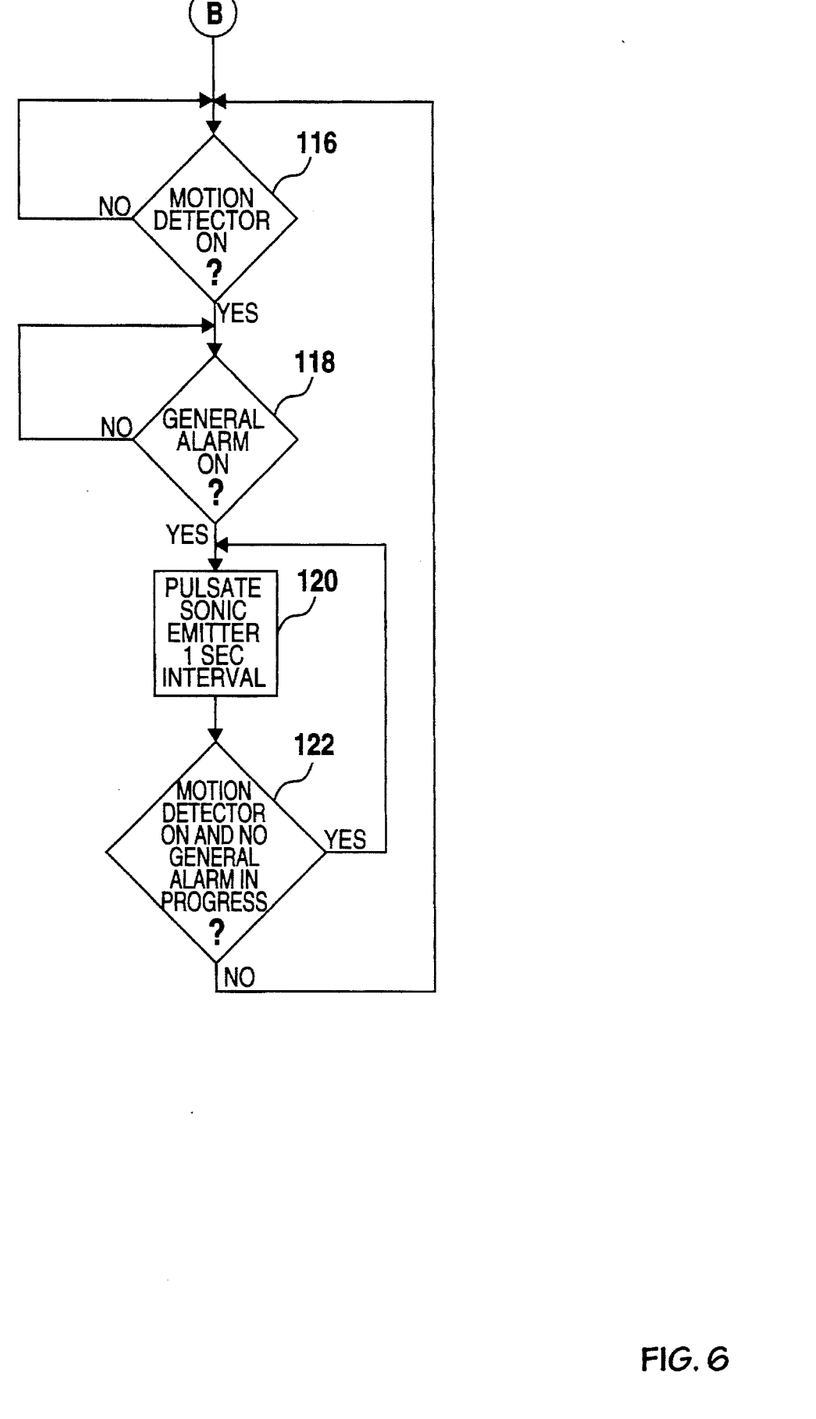
FIG. 6 provides a logic flow diagram of the sonic emitter operating sequence of the CPU of FIG. 3.
Figure 7:
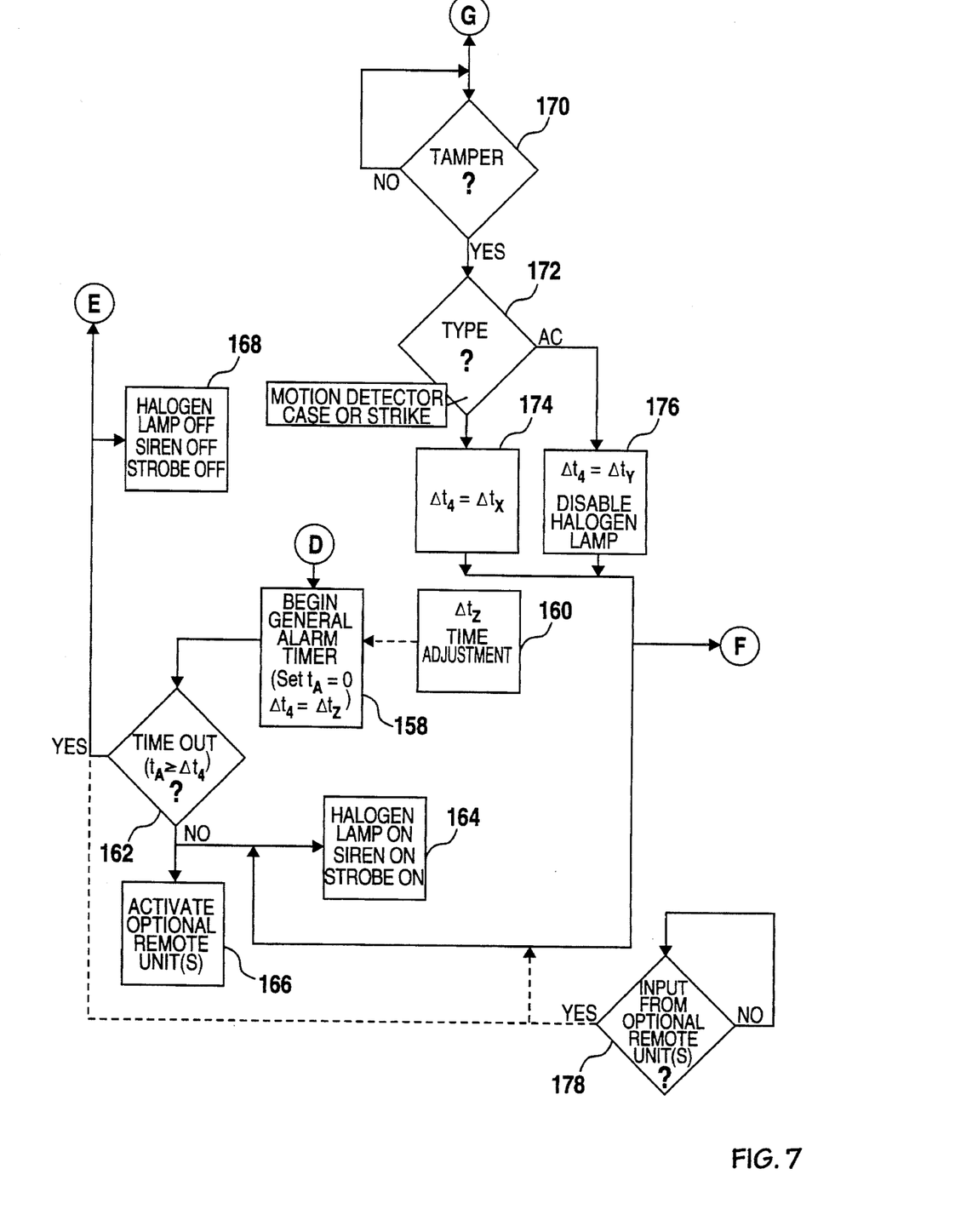
FIG. 7 provides a logic flow diagram illustrating the general alarm operating sequence of the CPU shown in FIG. 3.
Figure 8:
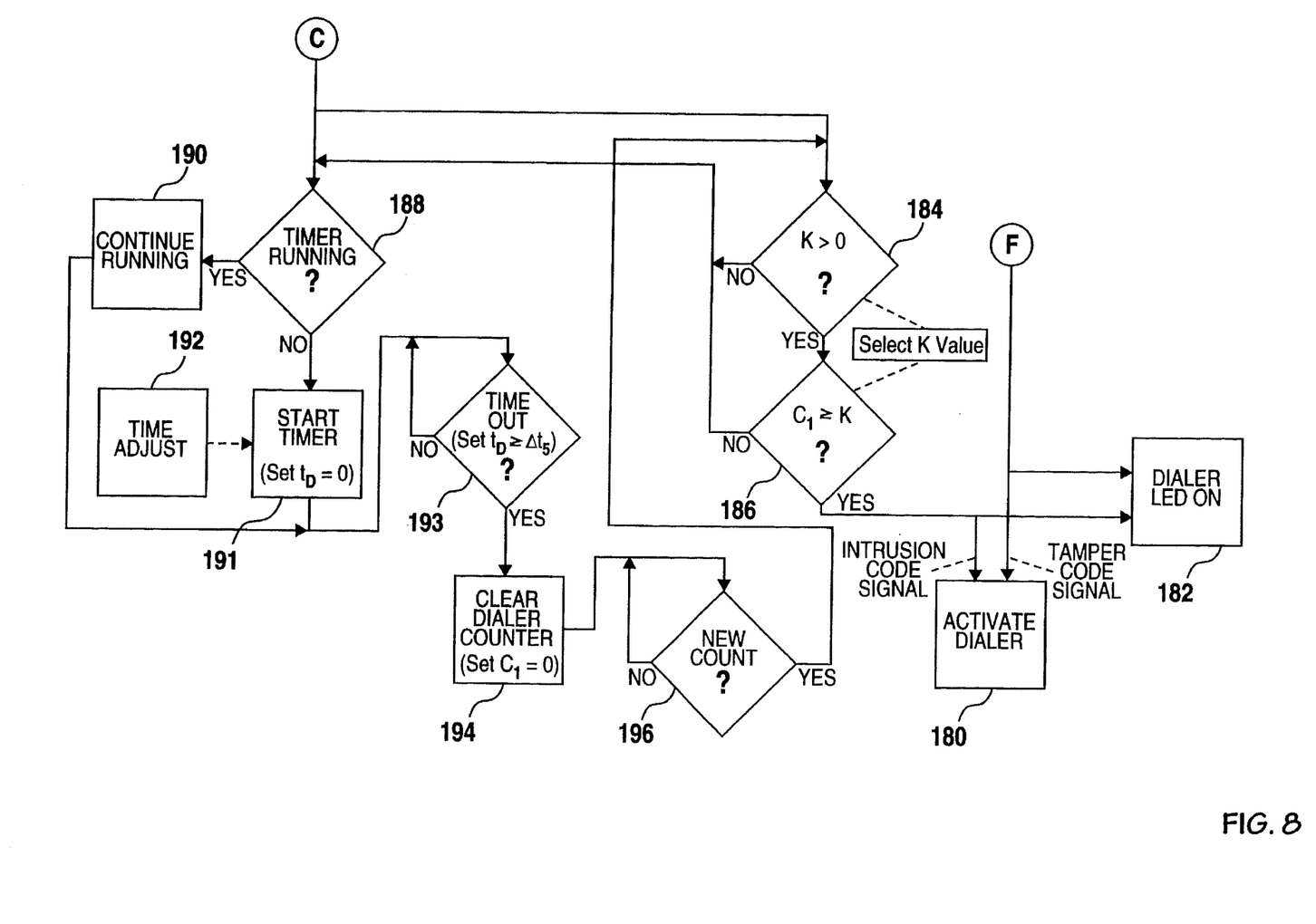
FIG. 8 provides a logic flow diagram of the telephone dialer operating sequence of the CPU of FIG. 3.

Several variables are utilized in the diagrams of FIGS. 5, 7 and 8. The definition of these variables is provided in Table I below.

TABLE I

| Variable | Definition |
| --- | --- |
| $t_c$ | Elapsed time since last event |
| $t_p$ | Prealarm timer |
| $\Delta t_1$ | Threshold time for motion-detector to be continuously tripped |
| C | Event counter |
| $C_1$ | Dialer counter |
| $\Delta t_2$ | Prealarm time interval |
| $t_T$ | Trip band timer |
| $\Delta t_3$ | Trip band time interval |
| $\Delta t_4$ | Selected general alarm time interval |
| $\Delta t_5$ | Dialer time interval |
| $t_A$ | General alarm timer |
| $t_D$ | Dialer timer |
| K | Event counter threshold |
| $t_x$ | Tamper general alarm interval |
| $t_y$ | Power interrupt general alarm time interval |
| $t_z$ | Nominal general alarm time interval |

Referring now to FIG. 5, the pre-alarm and first event operating sequence will be described. Commencing at point A (from FIG. 4), the operating sequence progresses to block 124, wherein the motion detector 14 is polled to determined whether motion is currently detected. If no motion is detected, the operating sequence loops back to block 124. If, however, motion is detected, the illumination source 18, i.e., halogen lamp, is turned on at block 126. Additionally, the operating sequence advances to block 128, where an event timer $t_c$ is initiated, i.e., set equal to zero. The event timer $t_c$ then runs to track the time that has elapsed from the time motion was initially detected. The operating sequence now branches to several different paths.

A first path 130 sequences the operation to block 131. The elapsed time since the previous event, i.e., the current value of $t_c$, is compared to a threshold value, denoted as $\Delta t_1$. Threshold $\Delta t_1$ is a time period, such as 10 seconds. If the motion detector 14 ceases to detect motion during this period, the timer $t_c$ stops running, and providing that $t_c$ is less than $\Delta t_1$, the operating sequence loops back to block 131. However, if the event timer $t_c$ continues to run until it is equal or exceeds the threshold $\Delta t_1$, the operating sequence advances to block 132. This indicates motion has been continuously detected during the time period corresponding to the threshold interval $\Delta t_1$, and the pre-alarm mode is entered.

When the operating sequence has advanced to block 132, i.e., pre-alarm mode has been entered, the prerecorded warning message is played from the speaker 78. This coincides with entry into the "pre-alarm" mode. A counter C, which is initially set to zero upon initiation of the system at block 94, is incremented by one at block 134 to indicate that an intrusion "event" has occurred. Additionally, a dialer counter $C_1$ is incremented, as shall be described subsequently, relative to the operation of the automatic telephone dialer. The program additionally sequences to block 136, and a pre-alarm timer $\Delta t_p$ is initiated by setting its value to zero.

A pre-alarm timer $\Delta t_2$ determines the duration of the pre-alarm mode, and can be manually set from the control panel 28, as indicated by block 140. From block 136, the program advances to point C for potential activation of the automatic telephone dialer 86, as shall be described subsequently with reference to FIG. 8. At the same time, the program advances to block 138 to compare the current value of the pre-alarm timer $\Delta t_p$ to the pre-alarm timer interval $\Delta t_2$.

If at block 138 the value of $\Delta t_p$, i.e., the time that has elapsed since the pre-alarm mode was entered, is less than the pre-alarm timer interval $\Delta t_2$, the operating sequence loops back to again pass through block 138, and power to the illumination source 18 is maintained (block 126). However, if the time elapsed since initiation of the pre-alarm timer $t_p$ exceeds or equals the pre-alarm timer interval $\Delta t_2$, the operating sequence advances to block 142. In block 142, the motion detector 14 is rechecked to determine whether motion is still detected. If motion is still detected, the operating sequence advances to point D (FIG. 7) to enter the "general alarm" mode, as shall be described subsequently. However, if the motion detector is no longer sensing motion at the end of the pre-alarm time interval (block 142), the operating sequence returns back to block 124 to restart the pre-alarm and first event sequence.

Referring still to FIG. 5, at block 128, upon initial motion detection the operating sequence also progresses along a second path to block 144. The operating sequence of the CPU will now depend on a mode selected by the user using a header jumper (not shown) included in circuitry associated with the control unit 64, or alternately using a switch included in the control panel 28. If the system is set to a "direct" mode, this initial detected motion will place the system immediately in pre-alarm mode, by advancing the sequence to block 132 to start a verbal warning, and block 136 to begin the pre-alarm timer. However, if the direct mode is not selected, the system is instead set to "trip band" mode, and the operating sequence advances to block 146.

In the trip band mode, the CPU determines whether two isolated instances of motion detection occur within a short enough time interval to represent a potential intrusion, in which case the pre-alarm mode is entered. In block 146, if the motion detector is still on, the illumination light source is maintained "on" at block 126. However, if the motion detector 14 no longer senses motion, the illumination light source 18 is turned off at block 148. The operating sequence then advances to block 150, where the trip band timer $t_T$ is initiated by setting equal to zero. The trip band timer will be compared to a trip band time interval $\Delta t_3$, which can be manually adjusted from the control panel 28, as indicated by block 152. The trip band timer $t_T$ continues to run until a second event is detected.

During this time, the operating sequence advances to block 154, where the current value of the trip band timer $t_T$ is compared to the trip band timer interval $\Delta t_3$. If the trip band timer $t_T$ increases to the point that it exceeds or is equal to the trip band time interval $\Delta t_3$, then no intrusion event is determined, and the operating sequence returns back to block 124. If the current value of the trip band timer $t_T$ is less than the trip band time interval $\Delta t_3$, the operating sequence advances to block 156. At block 156, the motion detector is polled to see whether motion is currently sensed. If not, the operating sequence cycles back to block 154 to again check the elapsed trip band timer. However, if the motion detector does still sense intrusion, meaning that motion has been detected at two discreet times separated by a time period less than the trip band time interval $\Delta t_3$, then an actual intrusion event may be occurring, and the operating sequence advances to blocks 132 and 136 to enter the pre-alarm mode.

Referring now to FIG. 7, the operation sequence for the general alarm mode will be described. Starting at point D, which continues from FIG. 5, at the conclusion of the pre-alarm mode, the operation sequence next progresses to block 158, where a general alarm timer $t_A$ is initiated, i.e., starts running. Additionally, a selected general alarm time interval $\Delta t_4$ is set equal to $\Delta t_Z$, a nominal general alarm time interval. The $\Delta t_Z$ time interval corresponds to the period of time that the general alarm is normally enabled, which is determined as sufficient time to repel intruders. One suitable time duration is a period of 2–5 minutes, which may be selectively adjusted at the control panel 28, as indicated in block 160.

After initiation of these variables, the program progresses to block 162, where the current value of the general alarm timer $t_A$, which is accumulating as time elapses, is compared to the selected general alarm time interval $\Delta t_Z$. If the elapsed time $t_A$ since the initiation of the general alarm mode is less than the selected general alarm time interval $\Delta t_4$, the general alarm mode continues and the operation sequence progresses to block 164, wherein the illumination source 18 is maintained "on", the siren 82 is turned on, and the strobe light source 19 is turned on. Additionally, the operation sequence progresses at the same time to block 166, where any interlinked security systems 10 are activated and placed in the general alarm mode, subservient to the security system 10 that detected the intrusion.

From operation sequence block 164, the program sequences back to block 162 again, where the current value of the timer $t_A$ is again compared to the selected alarm time interval, $\Delta t_4$. This continues until the elapsed general alarm timer $t_A$ is determined to be greater than or equal to the selected general alarm time interval $\Delta t_4$. At this point the program cycles to block 168, whereat the illumination source 18, strobe light source 19, and siren 82 are all turned off. The program then returns to point E, corresponding to point E in FIG. 4 of the function activation flow diagram. Thus, after the end of the general alarm, the program sequences back to the point where the functions are all enabled and the pre-alarm and first event sequence recommences.

Referring still to FIG. 7, point G continues from the function activation sequence of FIG. 4. From point G, the program sequences to block 170. In block 170, the CPU checks to determine whether the security system 10 has been tampered with, either by striking, attempting to open the motion detector 14, or interrupting the primary AC power source. If none of these conditions have occurred, the program continues to loop back to block 170 to recheck for these occurrences. However, if any of these tamper conditions are determined to have occurred, the program sequences to block 172, where the type of tampering is determined.

If the security system 10 has been struck, resulting in detection of shock by the shock sensor 88, or if the case of the motion detector 14 has been tampered with, the program sequences to block 174. The selected general alarm time interval $\Delta t_4$ is then set equal to $\Delta t_X$, the tamper general alarm time interval. One suitable value for this time value is 2.5 minutes. The program then sequences both to point F, corresponding in FIG. 8 to activation of the automatic telephone dialer, as well as to block 164 of FIG. 7 for initiation of the alarms that are enabled during the general alarm mode.

Referring again to block 172 in FIG. 7, if the type of tampering detected is determined to be AC power interruption, the program sequences to block 176, where the selected general alarm time interval $\Delta t_4$ is set equal to $\Delta t_Y$, the AC interrupt general alarm time interval. Again, the program sequences to point F for activation of the automatic telephone dialer, and to block 164 for activation of system alarms.

Whenever AC power is interrupted, such as was determined in block 172 of FIG. 7, at any other point in the operating sequence, the armed LED 38 is deactivated, and a display in the control panel 28 that displays the current value of the event counter C is also extinguished, in order to conserve power from the backup battery 68 power supply.

Referring still to FIG. 7, block 178 represents an interruption in the normal operational sequence, whereat input from an optional remote interlinked security system 10 may be received. If no signal is received from a remote security system 10, this portion of the operating sequence simply continues to loop repeatedly. However, once input from another security system 10 indicating that an intrusion has been detected is received, the program sequences automatically to block 164 for activation of the general alarm. The general alarm is maintained until the detecting security system 10 determines that the general alarm should be concluded, at which point operation sequences to blocks 168 and point E.

Attention is now directed to FIG. 8 for a description of the automatic telephone dialer sequence. If a tamper condition existed in FIG. 7, the program sequenced to point F in FIG. 8, as previously described. The operation program then sequences to block 180 to activate the automatic telephone dialer, and also to block 182 to illuminate an LED included on the control panel indicating that the dialer is operational.

If during the initiation of the pre-alarm mode (FIG. 5), the program sequences to point C, the program continues at point C in FIG. 8 by proceeding to block 184. A control on the control panel 28 allows selection of an event threshold K parameter. This is a value that is selected as the number of intrusion events detected during operation of the control unit 64 that are required to activate the automatic telephone dialer. In block 184, the selected value of the event counter threshold K is checked to determine whether it is greater than zero.

If the value is greater than zero, meaning that the user has selected a threshold number of events that must have occurred before the automatic telephone dialer is activated, the program sequences to block 186. In block 186, the current value of the dialer counter $C_1$, which keeps track of the number of events that have occurred since the dialer counter was last cleared, is compared to the event counter threshold K. If the number of events is greater than or equal to the threshold, the program sequences to block 180 to activate the automatic telephone dialer, and block 182 to illuminate the dialer LED. The signal generated by the automatic telephone dialer 86 can be coded to indicate to the monitoring individual or agency whether an intrusion or tampering has occurred, as indicated in block 180.

If in block 184 it is determined that the value of the event counter threshold K is not greater than zero, meaning that a value of zero has been selected by the user, or if in block 186 the current value of the event counter C is found to be less than the event counter threshold K, the program sequences to block 188. In block 188, the program determines whether a dialer timer has been initiated. If the timer is already running when checked in block 188, the program sequences to block 193, described below. If the timer is not yet running, the operation sequence progresses to block 191, where the dialer timer $t_D$ is initiated, i.e., starts running, by setting $t_D$ equal to zero. The value of the dialer timer $t_D$ can be adjusted as indicated in block 192 by dip switches included on circuitry of the control unit 64, or at the control panel 28. If the timer is already running when checked in block 188, the program sequences to block 193, described below.

The operation sequence then progresses to block 193, where the elapsed time represented by the dialer timer $t_D$ is compared to a dialer time interval $\Delta t_5$ that has been programmed into the CPU. If the elapsed time that has passed since the dialer mode was activated is less than the dialer time interval, the operation sequence cycles back to block 193 again. However, if the elapsed time represented by dialer timer $t_D$ is greater than or equal to the dialer time interval $\Delta t_5$, the program sequences to block 194, wherein the dialer counter $C_1$ is cleared by setting it equal to zero. This indicates that the dialer has timed out, as set by the dip switches above, and resets the event counter to again begin counting the number of events necessary to next activate the automatic telephone dialer. The purpose of counting the number of events occurring during a fixed period ($t_D$) is to generate a call for aid only if a sufficient number of intrusion events (K) occur in a short period of time ($t_D$), such as, for example, 15 minutes, because this indicates an actual intrusion is likely. False alarms are thus further minimized in this manner. The operation sequence then progresses to block 196, where the operating sequence waits until the dialer counter $C_1$ is incremented (block 134 in FIG. 5), indicating that a pre-alarm mode has then been entered. The event counter C, which counts the number of events that have occurred since system startup or reset, should be distinguished from the dialer counter $C_1$, which counts the number of events that have occurred since the dialer timer $t_D$ was last started. At that point the operation sequence progresses to block 184 again.

The present invention thus provides a security system and method for operating that has successive stages of alarm activity. When an intrusion is first detected, the ultrasonic transducer 74 is operated to clear the area of non-human animals, and thus avoid false alarms. The operating sequence then progresses to pre-alarm, general alarm, and dialer modes for successive increasing alarm activity until the monitored area is cleared of human intrusion.

While a preferred operating sequence has been described above, it would be readily apparent to those of ordinary skill in programming that many variations in the sequence could be carried out to still achieve the same result. Likewise, variations, modifications and substitutions can be made to the preferred embodiment of the invention described above. For example, rather than being mounted within a housing, the system components could be mounted on a support frame. It is thus intended that the scope of letters patent granted hereon be limited only by the definitions of the invention contained in the following claims.

The embodiments of the invention in which an exclusive property or privilege is claimed are defined as follows:

1. A portable security system suitable for protection of property within a monitored area from human intruders, the security system comprising:

a portable housing;

a detector mounted on the housing for sensing an intrusion event within the monitored area and producing a detection signal when an intrusion event is detected;

a first alarm generator mounted within the housing for producing an output signal effective at clearing the monitored area of non-human animal intruders, the output signal not being alarming to humans;

a second alarm generator mounted within the housing for producing a second alarm capable of startling a human intruder;

a controller mounted within the housing for sequentially activating the first alarm generator for a predetermined period of time in response to the detection signal from the detector and thereafter activating the second alarm generator if the detector is then producing the detection signal; and a power supply for powering the detector, the first and second alarm generators and the controller.

2. The security system of claim 1, wherein the first alarm generator comprises an ultrasonic signal generator mounted within the housing and operable to produce an ultrasonic signal transmitted from the housing when activated by the controller in response to the detection signal from the detector.

3. The security system of claim 2, wherein the controller operates to activate the ultrasonic signal generator for at least a portion of a predetermined threshold time period in response to the detection signal from the detector, followed by the activation of the second alarm generator at the end of the predetermined time period if the detector is then producing the detection signal.

4. The security system of claim 1, wherein the second alarm generator is selected from the group consisting of a first illumination source and a verbal message generator, further comprising a third alarm generator that is activated sequentially after activation of the first alarm generator if a detection signal is still being produced by the detector, the third alarm generator being selected from the group consisting of a high decibel audio alarm, a strobed illumination source, and an automatic telephone dialer.

5. The security system of claim 4, wherein the second alarm generator comprises a verbal message generator, further comprising means mounted within the housing and linked to the verbal message generator for recording a verbal message for broadcasting by the verbal message generator.

6. The security system of claim 1, wherein the detector comprises a motion detector that produces the detection signal when motion is sensed within a detection zone extending from the detector.

7. The security system of claim 1, wherein the second alarm generator comprises a high decibel audio alarm.

8. The security system of claim 1, further comprising an automatic telephone dialer housed within the housing and activatable by the controller in response to the detection signal from the detector to cause the automatic telephone dialer to send a signal to a remote site for summoning aid to the monitored area.

9. The security system of claim 8, wherein the controller is operable to activate the automatic telephone dialer after the detector has detected a predetermined number of intrusion events in excess of a selected threshold number of intrusion events during a predetermined time period.

10. The security system of claim 1, further comprising a shock sensor mounted within the housing for detecting mechanical impacts to the housing, wherein the controller is operable to activate the first or second alarm generator in response to detection of an impact by the shock sensor.

11. The security system of claim 1, further comprising a tamper sensor for sensing attempts to breach the integrity of the housing, wherein the controller is operable to activate the first or second alarm generator in response to tampering sensed by the tamper sensor.

12. The security system of claim 1, wherein the power supply comprises a primary alternating current power supply and a backup direct current power supply, wherein if the primary power supply is interrupted during operation of the security system, the controller activates the first or second alarm generator utilizing power from the backup power supply.

13. A security system suitable for protection of property within a monitored area from human intruders, the security system comprising:
  a detector for sensing an intrusion within the monitored area and producing a detection signal when intrusion is detected;
  an alarm generator for producing an alarm capable of startling a human intruder;
  an ultrasonic signal generator;
  a controller for activating the ultrasonic signal generator for at least a portion of a predetermined first time period in response to the detection signal from the detector, and for activating the alarm generator at the end of the first time period if the detector is then producing the detection signal; and
  a power supply for powering the detector, the alarm generator, the ultrasonic signal generator, and the controller.

14. The security system of claim 13, wherein the controller also activates the alarm generator if the detector produces the detection signal continuously for a predetermined second time period commencing after the end of the first time period.

15. The security system of claim 13, wherein the alarm generator comprises a first alarm generator and a second alarm generator, each for producing an alarm capable of startling a human intruder, wherein the controller operates to activate the first alarm generator for a predetermined second time period, and activates the second alarm generator at the end of the predetermined second time period if the detector is then producing the detection signal.

16. The security system of claim 15, wherein the first alarm generator is selected from the group consisting of a first illumination source and a verbal message generator, and the second alarm generator is selected from the group consisting of a high decibel audio alarm, a strobed illumination source, and an automatic telephone dialer.

17. A method for protecting property within a monitored area from human intrusion, comprising:
  detecting an intrusion within the monitored area with a detector and producing a detection signal when intrusion is detected;
  generating an ultrasonic signal for at least a portion of a predetermined time period in response to the detection signal from the detector to clear animals sensitive to ultrasound from the monitored area; and
  activating an alarm generator capable of startling a human intruder at the end of the predetermined time period if the detector is then producing the detection signal.

18. A method for protecting property within a monitored area from human intrusion, comprising:
  positioning a plurality of portable security systems around the perimeter of the monitored area, each security system including a detector for sensing an intrusion within a corresponding detection zone and for producing a detection signal when intrusion is detected, an alarm generator for producing an alarm and a controller for activating the alarm generator in response to receiving the detection signal from the detector;
  forming a communication link between the plurality of portable security systems so that the controllers of the security system are capable of communicating with each other;
  operating the detector of each of the security systems until a detection signal is generated by the detector of one of the security systems; and
  sending a signal over the communication link from the controller of the security system having the detector that generated the detection signal to the controllers of the other security systems, whereby the controllers of the other security systems become subservient to the controller of the first security system that sent the signal, and the alarm generator of each of the security systems is activated by the controller of each of the security systems.

* * * * *